UNITED STATES PATENT OFFICE.

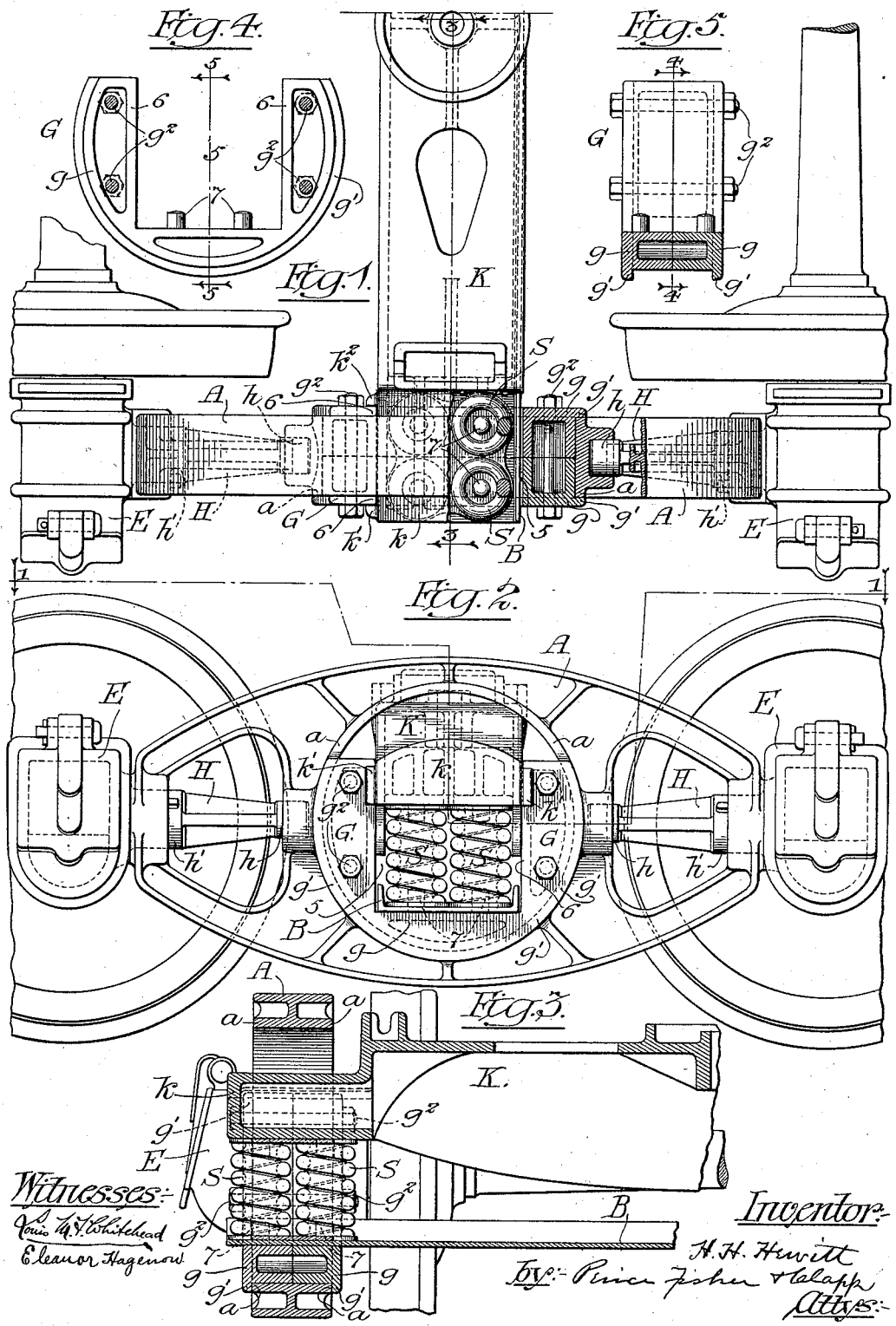

HERBERT H. HEWITT, OF BUFFALO, NEW YORK.

CAR-TRUCK.

1,072,723. Specification of Letters Patent. Patented Sept. 9, 1913.

Application filed January 17, 1912. Serial No. 671,607.

*To all whom it may concern:*

Be it known that I, HERBERT H. HEWITT, a citizen of the United States, and a resident of Buffalo, county of Erie, and State of New York, have invented certain new and useful Improvements in Car-Trucks, of which I do declare the following to be a full, clear, and exact description, reference being had to the accompanying drawing, forming part of this specification.

The present invention has relation more particularly to that type of car truck (shown in Letters Patent No. 1,009,747, granted to me November 3, 1911), in which the side frames of the truck are so connected to the transverse member or connections between the side frames that the side frames may rock in vertical planes with respect to said connecting member.

The primary object of the present invention is to more specifically adapt the broad features of my above mentioned patent to car trucks in which the transverse connection between the side frames consists of some simple contrivance, such as a channel bar or the like on which are sustained the springs that support the truck bolster.

The invention consists in the features of novelty hereinafter described, illustrated in the accompanying drawings and particularly pointed out in the claims at the end of this specification.

Figure 1 is a plan view (parts being broken away) showing a portion of a car truck embodying my invention and parts being shown on the sectional line 1—1 of Fig. 2. Fig. 2 is a view in end elevation showing the side frame and connected parts in operative position. Fig. 3 is a view in vertical section on line 3—3 of Fig. 1. Fig. 4 is a view in vertical section on line 4—4 of Fig. 5, this section being at the meeting faces of the section of the casting that fits within the side frame. Fig. 5 is a view in vertical section on line 5—5 of Fig. 4.

In the accompanying drawings, I have shown so much only of a car truck as is necessary to an understanding of the invention. Each of the side frames will be alike in construction and similarly united to the transverse connecting member of the truck.

While the present invention is susceptible of embodiment in trucks and side frames of various constructions, I have shown the side frames as formed each of a single casting A and of a construction similar to that set forth in an application No. 664,634, filed by me in the United States Patent Office, December 8, 1911. In the present case, as in the above mentioned application, the journal boxes E are shown as pivotally connected to the opposite ends of the side frame in such manner that these boxes may rock vertically at right angles to the frame. To this end each of the journal boxes E has a stud H projecting laterally and inwardly therefrom, these studs H being formed with bearing portions $h$ and $h'$ that set within suitable bearings formed in the side frame to receive them.

Each side frame A is cast with a central opening that is bounded by an annular flange $a$ and within this central opening is held, as for example, by means hereinafter described, the spring plank extending between the side frames, the ends of the truck bolster and the springs that support the bolster.

In the preferred form of my present invention, the transverse member B that extends between the side frames of the truck consists of a metal channel bar or spring plank, each end of which sets within a carrier or journal frame G that is mounted within the central opening of the corresponding side frame A. Preferably, each carrier G is formed of two similar sections consisting of hollow segmental castings, the upper portions of which are truncated and the central portion of which is formed with a large opening 5, preferably rectangular, to receive the spring plank and bolster ends and the bolster supporting springs. Each section $g$ of the casting G is formed with a flange $g'$, these flanges $g'$ being adapted to overlap the circular rim $a$ of the central opening of the side frame A when the sections $g$ of the casting are united together as by the through bolts $g^2$. If the casting G were made of a single piece, one of the flanges $g'$ would be omitted to enable the casting to be set within the central opening of the truck frame, and if the casting G were thus made of a single piece, the outer flange $g'$ would preferably be omitted and suitable pins or keepers would be employed to hold the casting in position with respect to the side frame.

When each of the castings G is within the central opening of its corresponding side frame A, the unobstructed upper part of the central opening of the side frame above the casting G will be sufficient to enable the end $k$ of the truck bolster K to be passed through the central opening of the side frame and dropped down into the space 5 of the casting G, so that the flanges $k'$ and $k^2$ that project laterally from the ends of the bolster K will overlap the vertical walls 6 of the casting G.

In order to conveniently unite the ends of the spring plank or transverse connecting member B to the castings G, each of the castings is preferably formed with integral vertical studs 7 adapted to enter corresponding holes formed in the ends of the transverse member or spring plank B.

In assembling the truck the circular castings G which in my present invention form the journals on which the side frames rotate, will be first applied to the side frames, as shown in the drawing, and then the side frames will be slipped onto the ends of the bolster, the openings in the side frames at the flattened upper side of the circular castings being just large enough to admit the ends of the bolster. The channel bar or spring plank B is then placed in position with its ends in the openings 5 of the castings G, and the studs 7 of the castings will pass up through the corresponding holes formed in the ends of the channel bar or spring plank. The springs S will then be set in position and the bolster will be dropped down upon them; and as the bolster is then dropped down onto the springs, the ribs or flanges $k$, $k'$ at the ends of the bolster will overlap and engage with the vertical walls 6 of the castings G, and by this means the side frames will be kept at proper distance and in parallel relation to each other.

When the parts of the truck are assembled for use, as shown in the drawing, each of the side frames A will be free to rotate with respect to the spring plank and truck bolster. The advantages incident to enabling the side frames to rotate with respect to the transverse connection between the side frames of the truck are fully set out in my Letters Patent No. 1,009,747, and need not be enumerated here.

My present invention is particularly desirable in that it enables the weight of the truck to be materially reduced and enables the broad invention of my hereinbefore mentioned patent to be applied in connection with the type of spring plank and bolster of tried and approved construction.

While I have described the preferred embodiment of my present invention, I wish it understood that the details of construction above set out may be varied without departing from the spirit of the invention and that features of the invention may be employed without its adoption as an entirety.

The present invention presents the first instance of a car truck comprising side frames, transverse connecting means (such as a truck bolster), supports or carriers separate from the truck bolster but interlocked with the ends thereof, and rotatably united to the side frames. By thus providing the side frames with rotatable supports or carriers separate from the transverse connecting means, the side frames may be connected by various constructions adapted to engage the rotatable supports or carriers.

Having thus described my invention what I claim as new and desire to secure by Letters Patent, is:—

1. A car truck comprising side frames, transverse connecting means extending between said side frames and separate supports or carriers for said transverse connecting means rotatably united to said side frames, said transverse means being connected at its ends to said supports or carriers.

2. A car truck comprising side frames provided with circular openings, transverse means extending between said side frames and separate supports or carriers detachably secured to the ends of said transverse means and rotatably mounted in said openings of the side frames.

3. A car truck comprising side frames provided with circular openings, transverse means extending between said side frames, and supports or carriers detachably secured to the ends of said transverse means and rotatably mounted in said openings of the side frames, said supports or carriers being flanged to engage the side frames.

4. A car truck comprising side frames provided with circular openings, transverse means extending between said side frames, and supports or carriers secured to the ends of said transverse means and rotatably mounted in said openings of the side frames, said supports or carriers being formed of separate sections united together.

5. A car truck comprising side frames provided with circular openings, transverse means extending between said side frames, and supports or carriers secured to the ends of said transverse means and rotatably mounted in said openings of the side frames, said supports or carriers being formed of separate sections united together and provided with flanges to engage the opposite sides of the side frames.

6. A car truck comprising side frames provided with circular openings, transverse means extending between said side frames, and supports or carriers secured to the ends of said transverse means and rotatably mounted in said openings of the side frame, said supports or carriers being smaller in one direction than the openings of the side frames.

7. A car truck comprising side frames provided with circular openings, transverse means extending between said side frames, and supports or carriers secured to the ends of said transverse means and rotatably mounted in said openings of the side frame, said supports or carriers being formed with open spaces to receive the ends of said transverse means.

8. A car truck comprising side frames provided with circular openings, transverse means extending between said side frames and comprising a lower spring plank or member and a truck bolster and supports or carriers secured to the ends of said spring plank or member and said truck bolster and rotatably mounted in said openings of the side frame.

9. A car truck comprising side frames provided with circular openings, supports or carriers rotatably mounted within said openings of the side frames and having open spaces, a spring plank or member having its ends within the open spaces of said supports or carriers, a truck bolster having its ends within the open spaces of said supports or carriers and springs interposed between said spring plank or member and said truck bolster.

10. A car truck comprising side frames having circular openings, supports or carriers rotatably mounted in said openings of the side frames and having open spaces with vertical walls, a spring plank or member having its ends within said open spaces of the supports or carriers, and a truck bolster having its ends within the open spaces of said supports or carriers and having lugs or flanges to engage the vertical walls thereof.

11. A car truck comprising side frames provided with circular openings, supports or carriers rotatably mounted in said openings of the side frames, said supports or carriers being shorter in vertical direction than the openings of the side frames and being formed with open spaces having vertical walls, a spring plank or member having its ends connected to said supports or carriers and a truck bolster having its ends of a size adapted to enter the unobstructed portion of the openings of the side frames and provided with lugs or flanges which interlock with the walls of said supports or carriers.

12. A car truck comprising side frames provided with circular openings, supports or carriers rotatably mounted in said openings of the side frames, said supports or carriers being formed with open spaces having one or more upwardly projecting studs at their bottoms, a spring plank having its ends extending into the open spaces of the supports or carriers and engaging the studs thereof, a truck bolster having its ends setting within the open spaces of the supports or carriers and provided with lateral flanges or projections to engage the side walls of said supports or carriers and springs mounted within said supports or carriers between the ends of the spring plank or member and the ends of said truck bolster.

13. A car truck comprising side frames, supports rotatably united to said side frames, a transverse spring supported truck bolster interlocked at its ends with said rotatable supports, wheel axles and journal boxes for said wheel axles pivoted to rock in transverse planes and held against relative vertical movement upon the ends of said side frames.

14. A car truck comprising side frames, supports or carriers rotatably united to said side frames and a vertically movable spring supported truck bolster having its ends detachably interlocked with said supports or carriers.

15. A car truck comprising side frames provided with circular openings, supports or carriers arranged within said openings and rotatably united to said side frames, and a vertically movable, spring supported truck bolster having its ends detachably interlocked with said supports or carriers.

16. A car truck comprising side frames provided with circular central openings, supports or carriers rotatably mounted within said openings and interlocked with said side frames, a transverse spring plank and a transverse truck bolster, said supports or carriers having openings for receiving the ends of said spring plank and said truck bolster, the latter being detachably interlocked with said supports or carriers, and springs interposed between said spring plank and said bolster.

HERBERT H. HEWITT.

Witnesses:
GEO. P. FISHER,
KATHARINE GERLACH.

---

Copies of this patent may be obtained for five cents each, by addressing the "Commissioner of Patents, Washington, D. C."